(No Model.)

A. J. WYLIE.
NUT LOCK.

No. 383,162. Patented May 22, 1888.

Witnesses.
John C. Perkins
Chas. G. Weed

Inventor.
Andrew J. Wylie
By Lucius C. West
Atty.

UNITED STATES PATENT OFFICE.

ANDREW J. WYLIE, OF RICHLAND, MICHIGAN.

NUT-LOCK.

SPECIFICATION forming part of Letters Patent No. 383,162, dated May 22, 1888.

Application filed August 8, 1887. Serial No. 246,392. (No model.)

*To all whom it may concern:*

Be it known that I, ANDREW J. WYLIE, a citizen of the United States, residing at Richland, county of Kalamazoo, State of Michigan, have invented a new and useful Nut-Lock, of which the following is a specification.

The object of this invention will appear in the following description and claim.

Figure 1:
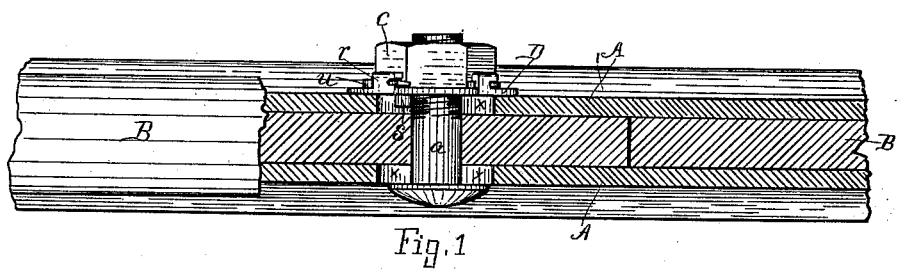
Figure 2:
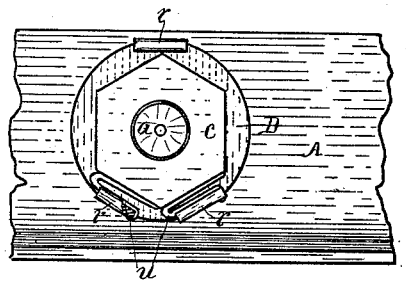
Figure 3:
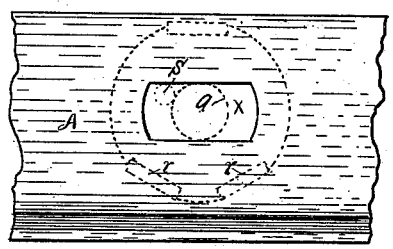
Figure 4:
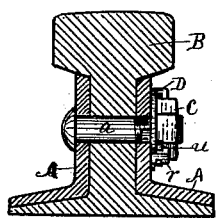
Figure 5:
Figure 6:
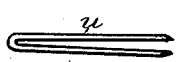

In the drawings forming a part of this specification, Figure 1 is a plan with part in section on a longitudinal line near bolt $a$ in Fig. 4; Fig. 2, a side elevation; Fig. 3, same as Fig. 2, with parts removed; Fig. 4, a vertical section on a line with bolt $a$ in Fig. 1; Fig. 5, lettered details in Fig. 1; and Fig. 6 is an enlarged detail, below described.

Referring to the letters marked on the drawings, B shows the rail of a railway, and A the fish-plates having the elongated hole $x$. The fish-plates are bolted to the rails by bolt $a$, held by nut $c$.

Between the nut $c$ and the fish-plate A is a washer, D, having a suitable number of flanges, $r$, at right angles to the washer. These flanges are channeled on the inside, (see $e$ in Fig. 5,) and in said channel and between the same and the nut $c$ of the bolt $a$ is inserted a key, $u$. One or more keys may be employed at the same time. (See Fig. 2.) In this figure the upper portion of one of the flanges $r$ is broken away to show how one of the prongs of the hair-pin key $u$ is bent around the end of the flange in a recess or niche in the end and over onto the outer face of the flange. This prevents the key from working out. This will appear clear also by referring to the lower right-hand flange $r$ in said Fig. 2, which shows the turned end of the prong of the key partly hid in its recess. The end of the key—that is, the left-hand end, as, for instance, in Fig. 6—is thick enough to prevent the key from working too far in; but this end, if desired, may be headed. Ordinarily the forked part of the key will be elastic, but not necessarily so if made with a prong to bend out, as above stated. The key thus placed in the recess of the flange of the washer and bent around the end in the end recess, as above set forth, cannot get out of place except by express design. The design is to locate the flanges $r$ so that one or more will always be at the proper point, or nearly so, for the insertion of the key or keys—at least so that but a slight turn of the nut $c$ will be necessary one way or the other after it has been screwed to place to bring one or more faces of the nut parallel with the flanges $r$.

At S is a stud near the hole in the washer and at right angles to the same and formed on the washer. This stud is inserted in the elongated hole $x$ of the fish-plate A, so as to contact with one side of said hole, as in Fig. 1, and by dotted position in Fig. 3, to prevent the washer from turning. This stud in like relation is shown in another application filed on the same date as the present case.

This same nut-lock may be employed for uses other than to secure the nuts $c$ in railways.

Having thus described my invention, what I claim as new, and desire to secure by Letters Patent, is—

The combination, with the bolt and nut, of a washer having a suitable number of right-angled flanges, said flanges having the recesses on the inside, and the end recesses and a forked key adapted for insertion between the flange and nut, one of the prongs of said key being bent outward around the end of the flange and in the end recess, substantially as set forth.

In testimony of the foregoing I have hereunto subscribed my name in presence of two witnesses.

ANDREW J. WYLIE.

Witnesses:
   GEO. O. B. HALL,
   SAMUEL FOLZ.